US011419265B2

(12) United States Patent
Martin

(10) Patent No.: US 11,419,265 B2
(45) Date of Patent: Aug. 23, 2022

(54) SELF-ADJUSTING MOWER DECK GAUGE WHEELS

(71) Applicant: DEERE & COMPANY, Moline, IL (US)

(72) Inventor: Matthew T Martin, Evans, GA (US)

(73) Assignee: DEERE & COMPANY, Moline, IL (US)

( * ) Notice: Subject to any disclaimer, the term of this patent is extended or adjusted under 35 U.S.C. 154(b) by 341 days.

(21) Appl. No.: 16/871,708

(22) Filed: May 11, 2020

(65) Prior Publication Data

US 2021/0345543 A1 Nov. 11, 2021

(51) Int. Cl.
*A01D 34/00* (2006.01)
*A01D 34/82* (2006.01)
*A01D 101/00* (2006.01)

(52) U.S. Cl.
CPC .......... *A01D 34/82* (2013.01); *A01D 34/001* (2013.01); *A01D 2101/00* (2013.01)

(58) Field of Classification Search
CPC ...... A01D 34/00; A01D 34/001; A01D 34/64; A01D 34/66; A01D 34/685; A01D 34/74; A01D 34/81; A01D 34/82; A01D 34/86; A01D 2101/00; A01D 75/00; A01D 75/18; A01D 75/185; A01D 75/30; A01D 75/303; A01D 75/306; B60B 33/04; B60B 33/045; B60B 33/06; B60B 33/063; F16F 9/064; F16F 9/065; F16F 9/067; F16F 9/22
See application file for complete search history.

(56) References Cited

U.S. PATENT DOCUMENTS

| | | | | |
|---|---|---|---|---|
| 2,967,388 A * | 1/1961 | Watkins | ................. | A01D 34/63 280/124.168 |
| 3,032,957 A * | 5/1962 | Boyer | .................... | A01D 34/63 56/17.4 |
| 4,153,237 A * | 5/1979 | Supalla | .................. | B60G 17/04 188/266.8 |
| 4,178,005 A * | 12/1979 | Kent, Jr. | ................. | B60B 33/04 172/417 |
| 4,325,211 A | 4/1982 | Witt et al. | | |
| 4,928,799 A * | 5/1990 | Zschiesche | ............. | F16L 37/42 267/221 |
| 5,085,044 A * | 2/1992 | Freier, Jr. | ............. | A01D 34/685 56/16.9 |
| 5,355,665 A | 10/1994 | Peter | | |
| 5,628,377 A * | 5/1997 | Le Gloan | ........... | B60G 21/0551 280/124.152 |
| 5,845,471 A * | 12/1998 | Seegert | .................. | A01D 34/74 56/17.2 |

(Continued)

*Primary Examiner* — Adam J Behrens

(57) ABSTRACT

A self-adjusting mower deck gauge wheel includes a first hydraulic cylinder fluidly connected to a second hydraulic cylinder. A gauge wheel is rotatably mounted on a gauge wheel shaft slideable in the first hydraulic cylinder between a fully extended position and a fully retracted position. In the fully retracted position, the mower deck rests flat on the ground and is not supported by gauge wheels. An orifice between the first and second hydraulic cylinders provides a high damping rate to slow travel of the gauge wheel shaft between the fully extended and fully retracted positions. A coil spring with a low spring rate also may be connected to a piston in the second hydraulic cylinder.

10 Claims, 2 Drawing Sheets

(56) References Cited

U.S. PATENT DOCUMENTS

| | | | | |
|---|---|---|---|---|
| 5,957,252 | A * | 9/1999 | Berthold | B60G 11/30 |
| | | | | 188/314 |
| 6,041,584 | A | 3/2000 | Hohnl | |
| 6,497,086 | B2 | 12/2002 | Bergsten et al. | |
| 6,711,885 | B2 | 3/2004 | Ferris | |
| 7,240,470 | B2 | 7/2007 | Clement et al. | |
| 9,327,553 | B2 * | 5/2016 | Woodrum | B60G 11/14 |
| 9,924,633 | B2 | 3/2018 | Ressler et al. | |
| 10,952,372 | B2 * | 3/2021 | Carlson | A01D 34/82 |
| 2003/0028997 | A1 * | 2/2003 | Plate | B62B 3/00 |
| | | | | 16/48 |
| 2004/0244348 | A1 | 12/2004 | Ferris | |
| 2007/0170025 | A1 * | 7/2007 | Presley | F16F 9/064 |
| | | | | 188/314 |
| 2009/0077939 | A1 * | 3/2009 | Fox | A01B 63/104 |
| | | | | 56/15.6 |
| 2016/0183454 | A1 * | 6/2016 | Akita | A01D 34/81 |
| | | | | 56/320.1 |
| 2017/0020068 | A1 * | 1/2017 | Ressler | A01D 34/74 |
| 2019/0037768 | A1 * | 2/2019 | Brunner | A01D 34/74 |

\* cited by examiner

SELF-ADJUSTING MOWER DECK GAUGE WHEELS

FIELD OF THE INVENTION

This invention relates to mower decks and more specifically to self-adjusting mower deck gauge wheels.

BACKGROUND OF THE INVENTION

Mower decks for cutting grass and similar vegetation typically may have several gauge wheels to prevent scalping or cutting grass too short on uneven ground. Gauge wheels typically are supported by brackets mounted to the top surface or outer wall at each of the four corners of the mower deck.

Gauge wheels may be adjustable to different heights. Each gauge wheel typically may be set at a height less than the cutting height of the rotary blades. For example, each gauge wheel may be set at 2.5 inches if the cutting height is 3 inches. This prevents the rotary blades cutting grass any lower than 2.5 inches. Many mower decks allow the operator to adjust the cutting height while seated, but not the gauge wheels without getting off the seat.

The operator also must disengage or move gauge wheels out of the way before driving a tractor over a drive-over mower deck when attaching or removing the mower deck. For example, the operator may move the gauge wheels up to a retracted position as shown in U.S. Pat. No. 7,240,470 assigned to Deere & Company.

Self-adjusting mower deck gauge wheels are needed that do not require the operator to get off the seat to adjust them. Self-adjusting mower deck gauge wheels are needed that do not require the operator to move the gauge wheels to a fully retracted position on a drive-over mower deck.

SUMMARY OF THE INVENTION

A self-adjusting mower deck gauge wheel is rotatably mounted to a gauge wheel shaft sliding in a first hydraulic cylinder. A piston slides in a second hydraulic cylinder connected to the first hydraulic cylinder. An orifice provides a high damping rate by restricting hydraulic fluid flow between the first and the second hydraulic cylinders. A coil spring attached to the piston provides a low spring rate. The self-adjusting mower deck gauge wheel may slide to the desired position without requiring the operator to leave the seat.

DESCRIPTION OF THE PREFERRED EMBODIMENT

Figure 1:
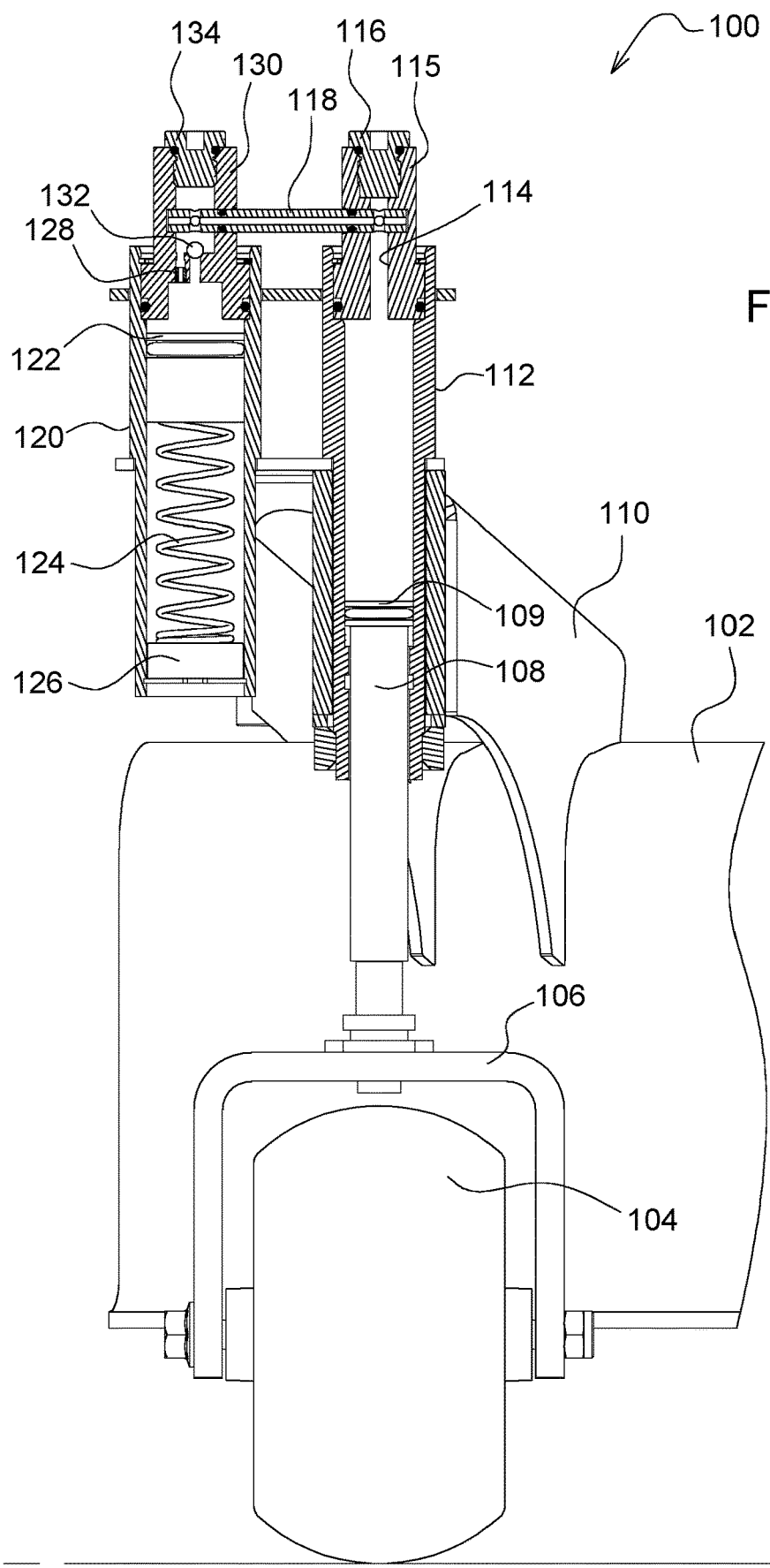
FIG. 1 is a front view, partially in cross section, of a self-adjusting mower deck gauge wheel in an extended position on a mower deck according to a preferred embodiment of the invention.
Figure 2:
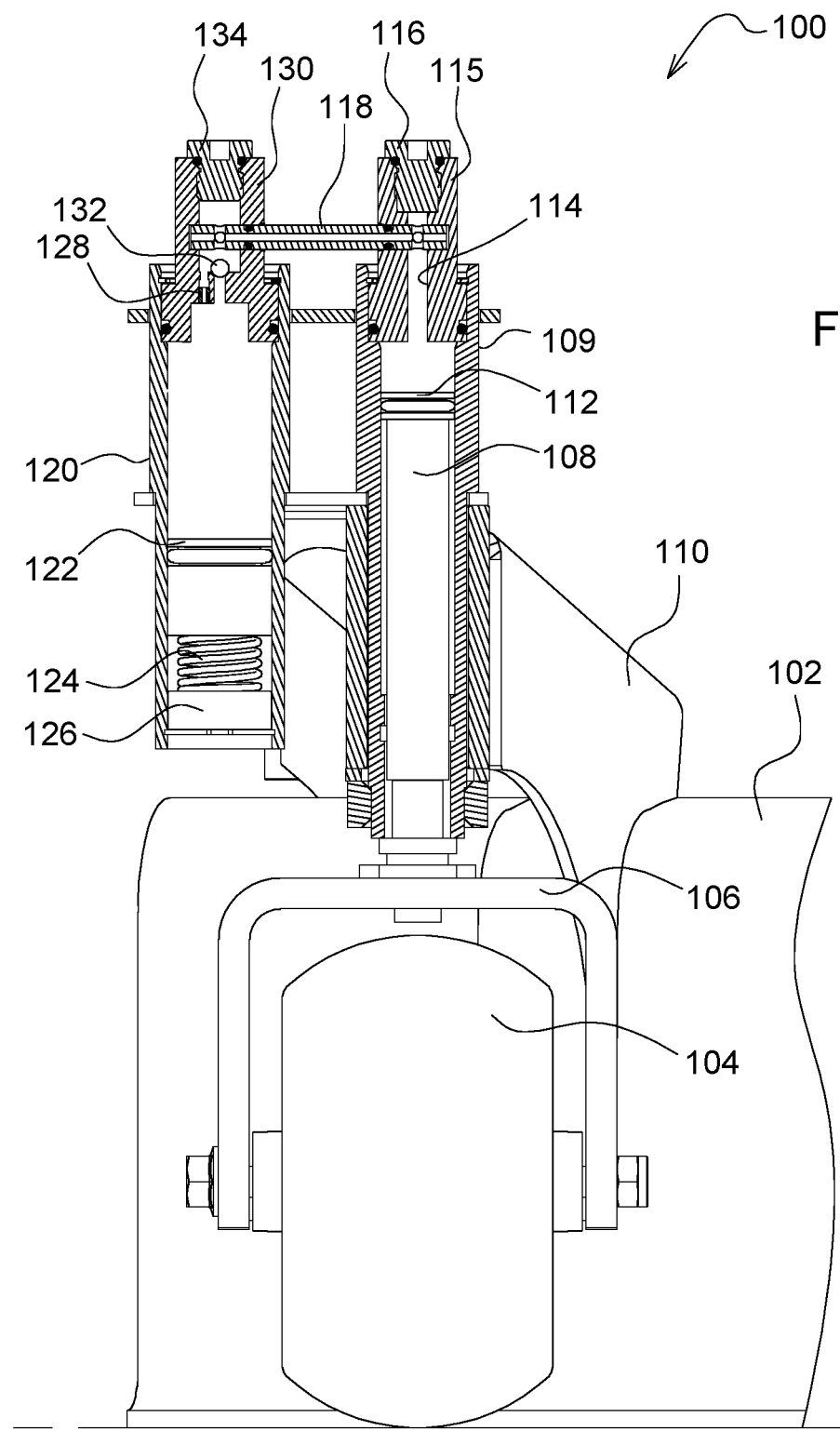
FIG. 2 is a front view, partially in cross section, of a self-adjusting mower deck gauge wheel in a retracted position on a mower deck according to a preferred embodiment of the invention.

In one embodiment shown in FIGS. 1-2, self-adjusting mower deck gauge wheel 100 may be mounted to each corner of mower deck 102. Gauge wheel 104 may be rotatably supported by yoke 106 which may be pivotally mounted on the lower end of gauge wheel shaft 108. A mower deck typically may have four self-adjusting mower deck gauge wheels, each having essentially the same construction.

In one embodiment shown in FIGS. 1-2, self-adjusting mower deck gauge wheel 100 may have a high damping rate and a low spring rate dynamic system. The high damping rate and low spring rate enables the self-adjusting mower deck gauge wheel to move between the extended position of FIG. 1 and the retracted position of FIG. 2 in response to axial loads. The self-adjusting mower deck gauge wheels move automatically between the positions, while the operator remains seated. The time required for the self-adjusting gauge wheels to move between the extended and retracted positions is preferably about 5 seconds up to a maximum of about 10 seconds.

In one embodiment, each self-adjusting mower deck gauge wheel 100 moves automatically from an extended position to a retracted position as the mower deck moves to the ground before driving over the mower deck. The weight of the mower deck forces the self-adjusting mower deck gauge wheels to retract fully in about 5-10 seconds. Each self-adjusting mower deck gauge wheel also moves automatically from the retracted position back to an extended position when the deck is lifted off the ground. Additionally, each self-adjusting mower deck gauge wheel has sufficient time to extend or retract to a new position contacting the ground whenever the operator moves the mower deck to a different cutting height. However, each self-adjusting mower deck gauge wheel does not have time to move between an extended and retracted position when hitting bumps during mowing.

In one embodiment, each self-adjusting mower deck gauge wheel 100 may provide a high damping rate by restricting the rate of hydraulic fluid flow between first and second hydraulic cylinders 112 and 120. Hydraulic fluid or other liquid in the two cylinders may provide an axial force to dampen movement of gauge wheel shaft 108 which slides in the first or damper side cylinder 112, and also dampens movement of piston 122 which slides in the second or accumulator side cylinder 120. Orifice 128 may restrict the flow rate of liquid between the first and second cylinders. As a result, about 5-10 seconds may be required for gauge wheel shaft 108 to travel between its lowest position at the bottom of damper side cylinder 112 shown in FIG. 1, and its highest position at the top of the damper side cylinder shown in FIG. 2. The length and diameter of the orifice, and the viscosity of the fluid, may be used to determine the length of time required for each self-adjusting mower deck gauge wheel to move between the extended position of FIG. 1 and the retracted position of FIG. 2. The low spring rate may be provided by coil spring 124 positioned between piston 122 and plug 126. As shown in FIG. 1, coil spring 124 may provide a spring rate high enough to provide an axial force urging piston 122 to slide upward in the second or accumulator side cylinder 120 so the self-adjusting mower deck gauge wheel reaches the extended position in about 5-10 seconds. As shown in FIG. 2, coil spring 124 also may provide a spring rate low enough to allow piston 122 to slide downward in the second or accumulator side cylinder 120 so the self-adjusting mower deck gauge wheel may reach the retracted position in about 5-10 seconds.

In one embodiment shown in FIGS. 1-2, each self-adjusting mower deck gauge wheel 100 may include orifice 128 through cap 130 on the second or accumulator side cylinder 120. Relief passage 132 also may be provided through cap 130 on the second or accumulator side cylinder 120. For example, relief passage 132 may include a check valve with a ball that normally may be seated to close the relief passage unless pressure in the accumulator side cylinder forces the valve open. Plug 134 may engage cap 130 to close and seal the top of the second or accumulator side cylinder. Self-adjusting mower deck gauge wheel 100 also may include passage 114 through cap 115 on the first or damper side cylinder 112, and passage 118 connecting between passage 114 and orifice 128. Passages 114 and 118 also may slow and restrict the flow rate between the first and second cylinders. Plug 116 may engage cap 115 to close and seal the top end of the first or damper side cylinder.

Having described the preferred embodiment, it will become apparent that various modifications can be made without departing from the scope of the invention as defined in the accompanying claims.

The invention claimed is:

1. A self-adjusting mower deck gauge wheel, comprising:
   a gauge wheel rotatably mounted to a gauge wheel shaft sliding in a first hydraulic cylinder;
   a piston sliding in a second hydraulic cylinder connected to the first hydraulic cylinder;
   an orifice restricting a hydraulic fluid flow between the first and the second hydraulic cylinders; and
   a coil spring attached to the piston;
   wherein the self-adjusting mower deck gauge wheel is configured to automatically move to a fully retracted position when supporting the weight of a mower deck.

2. The self-adjusting mower deck gauge wheel of claim 1 further comprising a restricted passage connecting the first and second hydraulic cylinders.

3. The self-adjusting mower deck gauge wheel of claim 1 wherein the gauge wheel shaft slides to the fully retracted position in the first hydraulic cylinder when supporting the mower deck.

4. The self-adjusting mower deck gauge wheel of claim 1 further comprising a relief valve from one of the first and the second hydraulic cylinders.

5. A self-adjusting mower deck gauge wheel, comprising:
   a gauge wheel shaft in a first cylinder having a high damping rate and a low spring rate in response to axial loads on the gauge wheel shaft;
   the high damping rate and the low spring rate slowing movement of the gauge wheel shaft whereby travel of the gauge wheel shaft between a fully extended position and a fully retracted position in the first cylinder requires at least 5 seconds;
   wherein the self-adjusting mower deck gauge wheel is configured to automatically move to the fully retracted position when supporting the weight of a mower deck.

6. The self-adjusting mower deck gauge wheel of claim 5 further comprising an orifice restricting hydraulic flow into or out from the first cylinder acting on the gauge wheel shaft.

7. The self-adjusting mower deck gauge wheel of claim 5 further comprising a spring force acting on the gauge wheel shaft.

8. The self-adjusting mower deck gauge wheel of claim 7 further comprising a piston in a second cylinder connected to the first cylinder; the spring acting on the piston.

9. A self-adjusting mower deck gauge wheel, comprising:
   a bracket on a corner of a mower deck supporting a first hydraulic cylinder that is fluidly connected to a second hydraulic cylinder;
   a gauge wheel rotatably mounted on a gauge wheel shaft slideable in the first hydraulic cylinder between an extended position for mowing and a retracted position in which a mower deck rests flat on the ground;
   an orifice between the first hydraulic cylinder and the second hydraulic cylinder to slow travel of the gauge wheel shaft between the extended position and the retracted position; and
   a spring connected to a piston in the second hydraulic cylinder;
   wherein the self-adjusting mower deck gauge wheel is configured to automatically move to the retracted position when supporting the weight of the mower deck.

10. The self-adjusting mower deck gauge wheel of claim 9, wherein the gauge wheel shaft slides in the first hydraulic cylinder between the extended position and the retracted position if a duration of axial forces acting on the gauge wheel are at least 5 seconds.

* * * * *